(12) United States Patent
Haase (10) Patent No.: US 8,013,719 B2
(45) Date of Patent: *Sep. 6, 2011

(54) COMBINATION LOW VOLTAGE SPEAKER / LIGHT FIXTURE

(76) Inventor: Edward H. Haase, La Quinta, CA (US)

( * ) Notice: Subject to any disclaimer, the term of this patent is extended or adjusted under 35 U.S.C. 154(b) by 1442 days.

This patent is subject to a terminal disclaimer.

(21) Appl. No.: 11/492,186

(22) Filed: Jul. 25, 2006

(65) Prior Publication Data

US 2007/0223723 A1 Sep. 27, 2007

Related U.S. Application Data

(63) Continuation-in-part of application No. 11/386,472, filed on Mar. 23, 2006, now Pat. No. 7,535,341.

(51) Int. Cl.
*G08B 27/00* (2006.01)

(52) U.S. Cl. ......... 340/326; 340/539.1; 340/539.19; 340/691.1; 340/693.5; 340/693.6; 340/693.11

(58) Field of Classification Search .......... 340/326, 340/539.1, 539.19, 691.1, 693.5, 693.6, 693.11, 340/332

See application file for complete search history.

(56) References Cited

U.S. PATENT DOCUMENTS

| | | | |
|---|---|---|---|
| 1,272,843 A | 7/1918 | Pape | |
| 2,083,753 A | 6/1937 | Turner | |
| 2,501,968 A | 3/1950 | Sassin | |
| 2,924,661 A | 2/1960 | Messeas, Jr. | |
| 3,023,083 A | 3/1962 | Hammes | |
| 3,194,952 A | 12/1963 | Wells | |
| 3,478,837 A | 11/1969 | Ross | |
| 4,214,298 A | 6/1980 | Propst | |
| 4,433,363 A | 2/1984 | Weber | |
| 4,528,620 A | 7/1985 | Weber | |
| 4,559,584 A | 12/1985 | Kuwahata | |
| D286,756 S | 11/1986 | Menke | |
| 4,776,018 A | 10/1988 | Cordier | |
| 4,875,143 A | 10/1989 | Fernandez | |
| 4,876,487 A | 10/1989 | Yang | |
| 5,772,307 A | 6/1998 | Philyaw | |
| 5,980,057 A * | 11/1999 | Christie | 362/86 |
| 7,535,341 B2 * | 5/2009 | Haase | 340/326 |
| 2003/0220705 A1 * | 11/2003 | Ibey | 700/94 |
| 2004/0175014 A1 | 9/2004 | Liu | |
| 2005/0078837 A1 * | 4/2005 | Hornback | 381/79 |
| 2005/0161067 A1 * | 7/2005 | Hollins | 135/16 |
| 2005/0185398 A1 * | 8/2005 | Scannell | 362/227 |
| 2008/0181426 A1 * | 7/2008 | Hornback | 381/77 |
| 2009/0067663 A1 * | 3/2009 | Ivey et al. | 381/386 |

* cited by examiner

*Primary Examiner* — Daryl Pope
(74) *Attorney, Agent, or Firm* — Kirk A. Buhler; Buhler & Associates (57) ABSTRACT

A combination low voltage light and sound producing fixture is disclosed for installation in a yard wall or ceiling or on a wall or ceiling. Outdoor lighting and sound is produced with low voltage lighting that is wired or solar powered for operation. The fixture may further include digital signal processing to modify the sound to account for obstructions in near or around the fixture. The fixture may include a feedback system that allow the fixture to self modify its frequency response. The signal to the fixture is provided by wired or wireless interface. The surface of the sound transducer can be reflective in nature to provide focusing or diffusion of the light from the lighting elements. The lighting elements are incandescent, fluorescent or low voltage LED type that may include adjustment for lighting intensity or color.

13 Claims, 5 Drawing Sheets

COMBINATION LOW VOLTAGE SPEAKER / LIGHT FIXTURE

CROSS REFERENCE TO RELATED APPLICATION

This application is a continuation-in-part of applicant's application Ser. No. 11/386,472 filed Mar. 23, 2006 now U.S. Pat. No. 7,535,341.

FIELD OF THE INVENTION

This invention relates to improvements in home and outdoor speaker and lighting fixtures. More particularly, the present invention relates to a fixture that includes one or more sound producing elements combined with one or more light producing elements and even more particularly the lighting element is a low voltage type. The signal for the sound can be provided from your wired or wireless transmitter/receiver and may include digital signal processing of the signal.

BACKGROUND OF THE INVENTION

Most houses are constructed today include one or more can style lighting fixtures were the lighting fixture is recessed into a wall or ceiling. Many house is also include an intercom or speakers that are also mounted in the wall or ceiling. The installation of the lighting and sound are usually provided by different tradesman during the construction of the house. Some patents have been issued on products to try to combine the lighting and sound as a single element.

U.S. Pat. No. 1,272,843 issued to H. G. Pape on Jul. 6, 1918, U.S. Pat. No. 4,433,363 issued on Feb. 21, 1984 and U.S. Pat. No. 4,528,620 issued on Jul. 9, 1985 both issued to Weber, disclose sound and lighting fixture that is suspended free ceiling. All three of these issued patents disclose a sound producing element combined with incandescent lighting. None of these three patents disclose that the lighting and sound fixture is for recessed ceiling or walled installation or for mounting on a wall or ceiling nor do they disclose using low voltage lighting, a wireless receiver or digital signal processing to account for placement or fixture construction. The orientation of the sound producing elements is also not adjustable to direct sound waves to a particular location.

U.S. Pat. No. 4,776,018 issued to Cordier on Oct. 4, 1988 and U.S. Pat. No. 5,980,057 issued to Cristie on Nov. 9, 1999 both disclose screw-in combination lighting/sound fixtures. Both of these two patents are for a standalone screw in lighting fixture that can be installed inside an existing lights socket and include a wireless receiver for receiving audio signal. Neither of these two patents provide a recessed lighting fixture they're simply lighting elements for installation in an existing fixture and do not include digital signal processing to account for placement or fixture construction. The sound producing elements eight oriented to direct sound waves to a particular location.

U.S. Pat. No. 2,083,753 issue to A. R. Turner on Jun. 15, 1937 and U.S. Pat. No. 4,953,584 issued to Kawahata et al. on Dec. 17, 1985 both disclose lighting fixtures for mounting on the ceiling. In the case of Turner, a portion of the fixture extensible below the ceiling and above the ceiling. In the case of Kawahata et al. fixture is mounted in the ceiling. Neither of these two patents discloses using low voltage lighting within the fixture. The orientation of the sound producing element is fixed within the fixture and cannot be oriented to direct sound waves to particular location. Neither of these two patents including digital signal processing to account for placement or construction of the fixture.

U.S. Pat. No. 4,876,487 issued to Yang on Oct. 24, 1989 discloses a low voltage illuminating lamp set with programmable output for garden use. This patent includes a sound producing element that emits and sound or flashes the lights prior to the lights being turned off. This is done to allow people to exit the area prior to the lights being turned off. While this patent provides some sound producing features, it is not intended for the use with speakers for producing music, nor does the system provide wireless connection for sound and or lighting.

What is needed is a combination lighting and sound fixture that can be mounted on a ceiling or wall or recessed in a ceiling or wall that all of which can be installed while the house or building is being constructed or later added by a homeowner or contractor. The ideal lighting sound fixture would include interchangeable components, to allow for replaceable parts, include signal processing to account for sound obstructions and allow the speakers to be oriented for optimal sound. The proposed application provides these features and functions in a complete package that can be installed in a wall or ceiling, and also can be attached or installed on the surface of a wall or ceiling.

BRIEF SUMMARY OF THE INVENTION

It is an object of the combination lighting sound fixture to provide a fixture for recessed mounting in the wall or ceiling. This provides a smooth surface with no obstructions and is most commonly found in houses that are manufactured today.

It is another object of the combination lighting and sound fixture to provide a fixture that is raised or surface mount orientation that provides a retro-look for older houses.

It is another object of the combination lighting and sound fixture to provide the fixture in a configuration where standard construction tools can be used to create the opening in the wall, install the fixture and make the electrical and sound connections with little or no training or licensing.

It is an object of the combination lighting and sound fixture to provide lighting that is low voltage and can be installed by both a licensed electrical contractor as well as a sound installation contractor. This provides the greatest flexibility for installation.

It is another object of the combination lighting and sound fixture to provide a powered or extendable feature that allows some or all of the sound and lighting the elements to extend out of the wall or ceiling to further enhance the illumination and our sound quality.

It is another object of the combination lighting and sound fixture to provide the sound producing elements that can be tilted, positioned or oriented to direct sound to a particular location or direction. This allows improved sound especially from high frequency sound waves that are directional.

It is another object of the combination lighting and sound fixture to provide the multiple sound producing elements where some of the sound producing elements produced low frequency sound waves and others produce high frequency sound waves. Fixture may have one or more Low frequency transducer (woofer) one or more mid-range or high frequency (tweeter) transducers. These speakers can be arranged in a co-axial orientation or in an off axis orientation.

It is another object of the combination lighting and sound fixture to provide the surface of the sound producing elements with the properties that allow the light to be reflected off the surface of the sound producing element(s) to direct the light into the room. The surface can alternatively diffuse the light to provide for more even lighting.

It is another object of the combination lighting and sound fixture to provide the signal to the sound producing elements as a wired connection or as a wireless connection. The wireless connection may also include a repeater that can increase the distance that the wireless signal is sent and received.

It is another object of the combination lighting and sound fixture to allow for interchangeable lighting elements. The lighting elements can include LED, incandescent, fluorescent, halogen or a variety of other lighting elements that are interchangeable. Lighting elements may also be filtered to provide lighting of different colors and may also be dimmable. A plurality of lighting elements can be used within the fixture without compromising the quality of sound that is produced. The lighting elements can vary intensity and color based upon the sound that is emitting from the speaker(s).

It is another object of the combination lighting and sound fixture to allow for lighting elements with a heat sink in physical proximity or in contact with the lighting element(s) to provide cooling of the lighting element(s).

It is another object of the combination light sound fixture to operate as an outdoor lighting and sound fixture where some or all of the low voltage lighting fixture include sound producing elements. This provides an even distribution of the light with walkway lighting and or illumination spot lighting.

It is another object of the combination light sound fixture to provide solar power to the fixture to allow wireless illumination and sound emitting. For a number of installation the routing of wiring is difficult. Solar charging of the fixtures is present in most locations. In the solar powered installation the fixture is charged with sun light and when ambient light is insufficient the light will turn on. If a wireless audio signal is present the sound emitting element will emit the audio signal. Another object include repeating the audio signal to additional light and sound element to increase the range of the base transmitting station.

It is still another object of the combination lighting and sound fixture to include digital signal processing to account for construction of the fixture location of the fixture, placement of the fixture and or other characteristics. The digital signal processing may include a notch or digital filter for canceling out extraneous noise such as power lines but can also filter out other signals that could couple into the audio signal.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
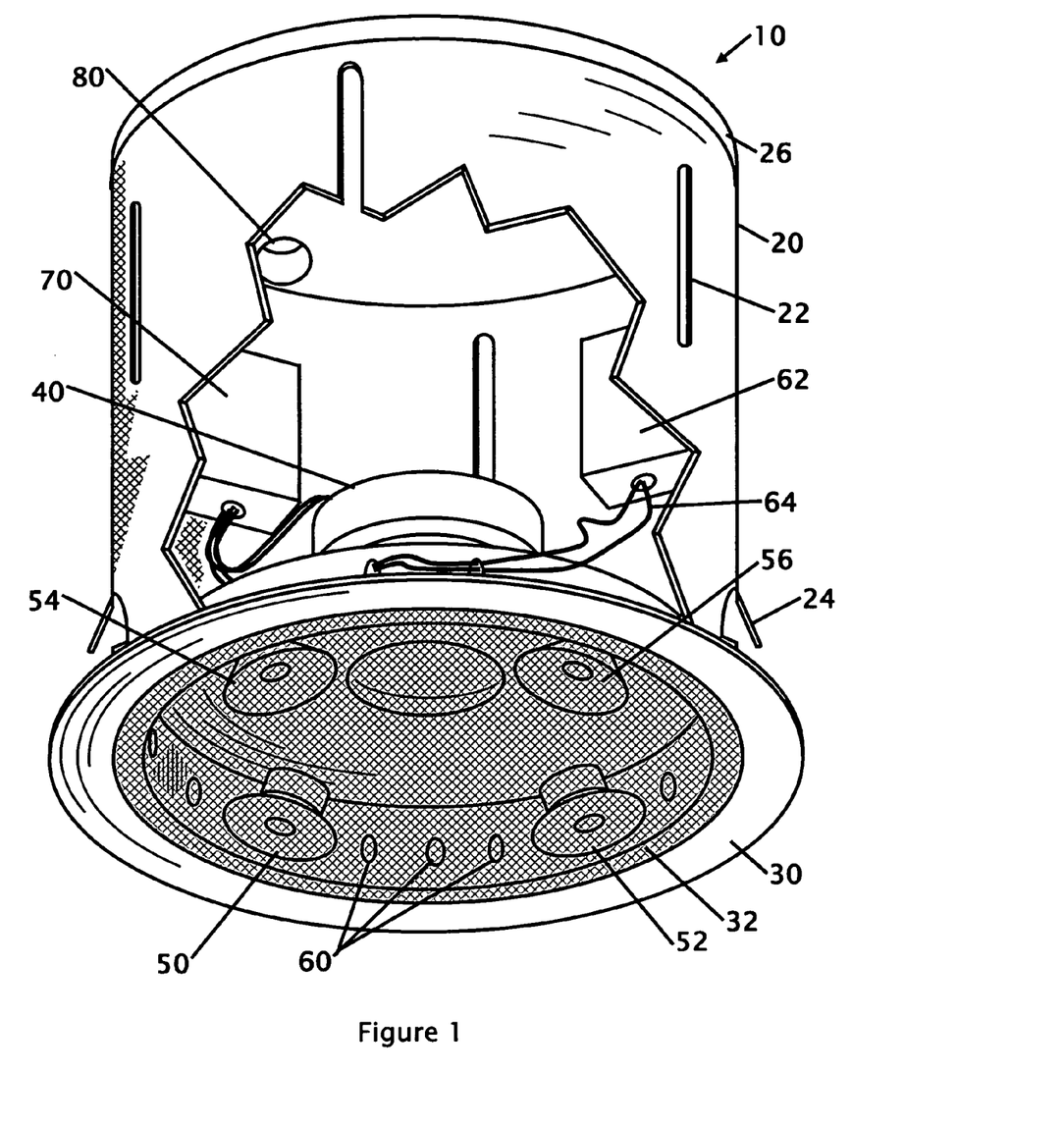
FIG. 1 shows an isometric view of the combination light and sound fixture before installation into a ceiling or wall.

FIG. 1 shows an isometric view of the combination light and sound fixture 10 before installation into a ceiling or wall. In this preferred embodiment the fixture 10 is in a cylindrical can configuration 20 where the can has an opening at one end for emission of the light and sound, and a closed end where the fixture exists in a wall or ceiling. But it is also contemplated that the end can be opened. In this preferred embodiment the fixture is fabricated from metal, plastic or other structural material as would be found in recessed or wall mounted fixtures. Tabs 24 or other securing mechanism such as but not limited to tie downs, dogs, nails or other similar mounting devices are used to secure the fixture in the wall or ceiling. Slots 22 may be alternatively used to mount the fixture on a wall or ceiling. These slots allow the installation depth to be adjustable after the fixture is installed and after the finished wall or ceiling thickness has been established. A lip 30 surrounds the outer edge of the fixture to provide a finished surface for the fixture to cover the edge of the wall or ceiling. The lip 30 can be removable or interchangeable. One or more conduit junction(s) 80 allow for the passage of electrical and or sound connection wires to be brought into the fixture. The components that are placed inside the fixture allow sound and light to be transmitted out of the fixture shell 20. The closed end of the enclosure 26 can be removable from the top of the shell 20.

Inside the fixture at least one sound emitting element is located. In this preferred embodiment multiple sound emitting elements are installed. A low frequency sound emitting element 40 (woofer) is placed within the fixture and oriented in an outward firing arrangement. Generally the woofer produces sound in the lower frequency range from about 20 hz and higher. The woofer is oriented in an outward firing orientation because it produces low frequency sound waves that are generally omni-directional and travel in all directions. For high frequency sound emitting elements (tweeters) 50, 52, 54 and 56 located below the woofer 40. The high frequency sound emitting elements tend to be directional and emit sound waves in the direction they are oriented. Generally the tweeter(s) produce sound from about 800 Hz to 20 KHz. Because the tweeters are directional, multiple tweeters are used in the fixture and are arranged to emit sound in different directions. The arrangement of the tweeter(s) can be a fixed 30 degree outward orientation or the tweeters can be located on a gimbaled holder that allows the orientation of each tweeter to be adjusted. In this preferred embodiment four tweeters are used, but the fixture could be made using just one tweeter or more that four. It is further contemplated that a single wide range speaker can be used in the fixture. In another contemplated embodiment a third mid range speaker is utilized to provide improved sound. The outside facing surface of the woofer and some or all of the tweeter(s) may be coated with a highly reflective surface to reflect light.

The reflective surface of the sound emitting components reflects light from lighting elements 60. In the preferred embodiment multiple LED lighting elements are placed in a ring within the fixture. LED lighting is used because it is easily configured to provide even lighting, LED lights operate at a lower voltage, LED lights are more efficient than most other forms of lighting, and LED's produce light with minimal heat. A total of 9 LED's operating at 1 watt of power will produce the same brightness as a 60 watt incandescent light bulb. The operation life expectancy of LED's is 100,000 hours resulting in 10 to 20 times longer life than a standard incandescent light bulb. The LED's may have a heat sink in physical proximity or in contact with the lighting element(s) to provide cooling of the lighting element(s). While the preferred illumination element is LED's, other forms of illumination include but are not limited to incandescent, fluorescent, neon and halogen. The low operational voltage of LED lights allows power to be supplied to the fixture at a voltage that might not require the installer to be a licensed electrician thereby allowing the fixture to be installed by the same person that installs the speaker connections. Title 24 of the UBC requires high efficiency lighting is required for 50% or more of the illumination in a room depending upon the room being illuminated. The need for increased efficiency is an important consideration for both energy efficiency and a reduction of heat that may require air conditioning to offset the heat produced by inefficient lighting. While the LED's are powered by lower voltage, high voltage can be brought into the fixture and the voltage reduced with a transformer or power placed in a junction box 62 located within the fixture (shown) or external to the fixture. Power to the lighting elements 60 is brought 64 from the electrical junction box 62 to the LED's.

The power converter reduces the incoming voltage (120 VAC) into a lower voltage of about 3.1 volts to operate the LED's. The operating voltage can include the audio signal superimposed on the power lines, or can be brought into the fixture from a separate electrical connection and then into a separate audio junction box 70. The audio junction box can include a Digital Signal Processor (DSP) to adjust the sound from the speakers to produce anything from a flat frequency response to a fixed directional response that can include surround sound. The user can further use the DSP to switch between omni-directional usage to facilitate distributed audio and also THX home theater applications. The DSP further can filter out 60 cycle noise to reduce or eliminate the 60 cycle noise from being transmitted out of the speakers. The DSP filter may include a notch or digital filter for canceling out extraneous noise such as power lines but can also filter out other signals that could couple into the audio signal. A screen 32 is shown covering the exposed surface of the fixture 10. The covering is constructed to allow the passage of both light and sound from the fixture.

In another contemplated embodiment the tweeters and or woofer and or light can extend from within the fixture to below the fixture as shown and described in FIG. 3 to improve the sound. In a number of installations it is not desirable for the sound to be heard in other rooms and to combat this issue sound insulation can optionally be placed around the outside of the fixture to reduce sound from being heard in other rooms where the sound is not desired.

Figure 2:
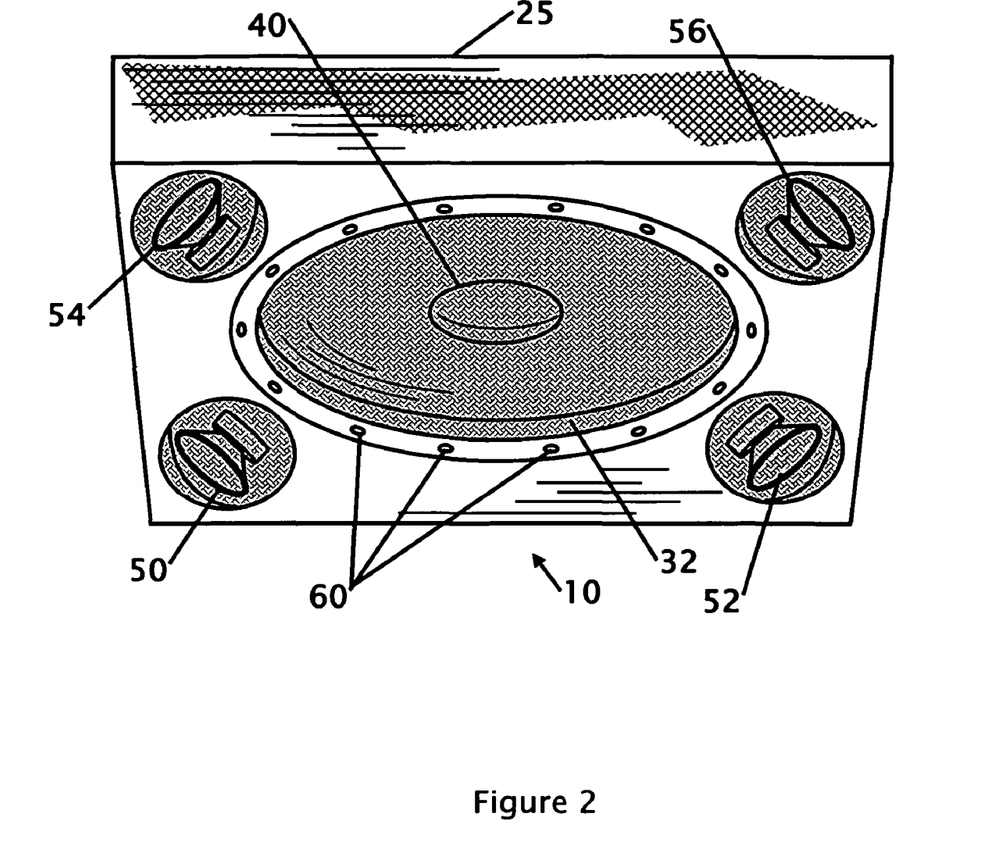
FIG. 2 shows an isometric view of a surface mounted combination light and sound fixture.

FIG. 2 shows an isometric view of a surface mounted combination light and sound fixture 10. In this contemplated embodiment the fixture is configured as a surface mount fixture to give the appearance of a retro style lighting fixture. The enclosure 25 is shown here in a squared or rectangular configuration, but other shapes are contemplated that provide the same or similar appearance to lighting fixtures that may be present in older homes or configured to be used in newer homes. In this figure separate covering 32 exist over each of the speakers. The LED lighting 60 exists around the central woofer 40. While this figure shows separate coverings over each speaker it is contemplated that a single cover can exist over all the sound emitting elements as well as over the light producing elements 60. Four separate mid/high frequency tweeters 50, 52, 54, and 56 exist on the corners of the fixture and are oriented in different directions to provide a more even distribution of higher frequency sounds. The tweeters can be positioned in fixed orientations or can be attached to individual gimbals where they can be individually oriented. As an example, if the fixture is located near a wall, two of the tweeters can be oriented to send sound diagonally with the wall, and the other two tweeters can be oriented to send sound out into the room.

Figure 3:
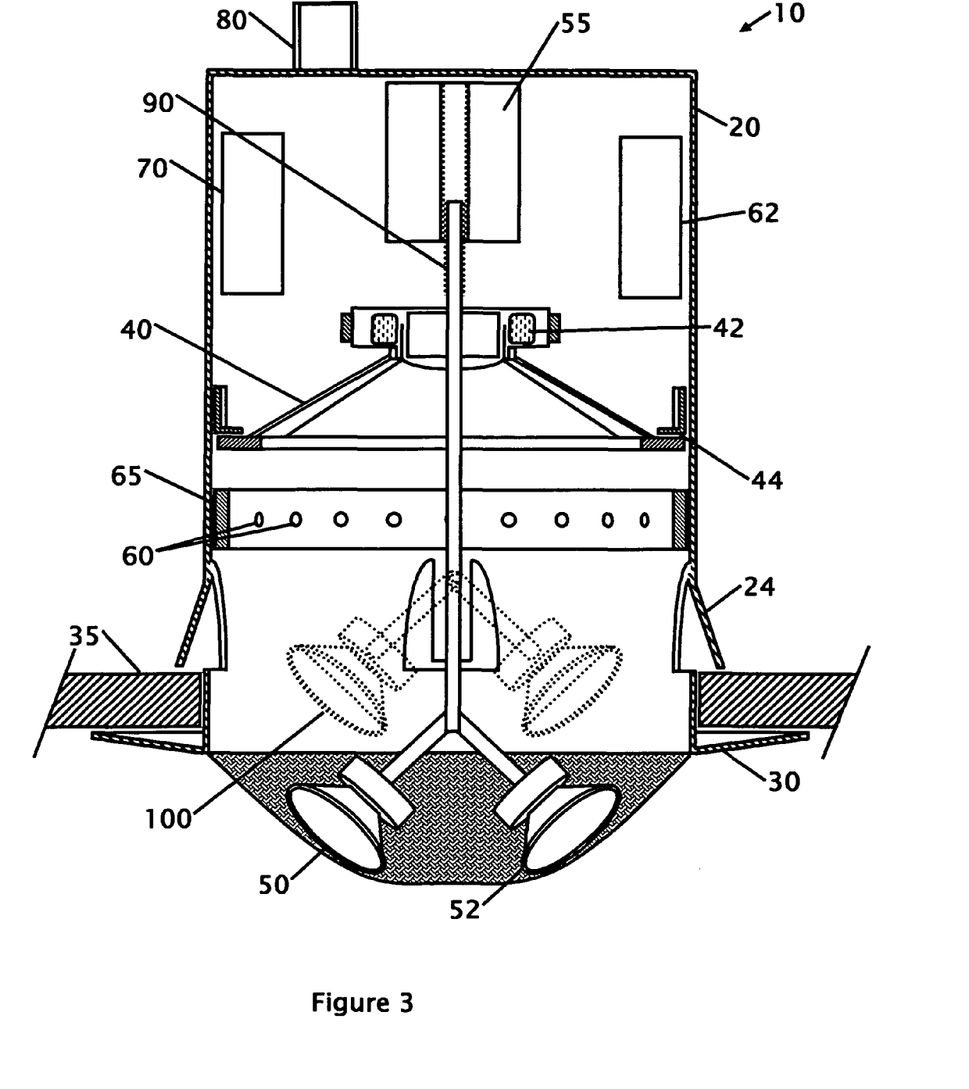
FIG. 3 shows a cross sectional view of the combination light and sound fixture with some or all of the sound producing elements extended below the height of the ceiling.

FIG. 3 shows a cross sectional view of the combination light and sound fixture 10 with some or all of the sound producing elements extended below the height of the ceiling. This configuration shows the fixture with the mid/high frequency sound producing elements existing within the fixture at 100, and also extended below the lip of the fixture 50 and 52. The mid/high frequency sound transducers are moved outside of the fixture to enhance the quality of the sound that may be muted or experience diffraction or dispersion problems when they operate within the fixture. A drive mechanism 55 moves the transducers inside and outside of the fixture using threads 90 or other movement mechanism(s). In the preferred embodiment the transducers are moved with a mechanical drive mechanism, but solenoids or other mechanical devices are contemplated. In the embodiment shown the transducers are linearly translated, but alternative movement systems are contemplated where the transducers are hinged or pivot to move them in and out of the fixture. A flexible covering 34 covers the outfacing surface of the fixture and when the transducers are lowered, the flexible covering stretches to accommodate the transducers. The flexible covering is removable to allow access to the interior of the fixture for replacement or servicing of the transducers, drive mechanism and or the lighting elements 60.

The fixture is shown in a circular can 20 configuration but may also exist as a squared, rectangular, geometric or irregular shape. The fixture is shown recessed in a wall or ceiling with drywall 35 or sheet rock holding the fixture in location or as a barrier within the wall. Tabs 24 retain the fixture in position on the wall or ceiling sandwiching the drywall with facia ring 30 located on the visible side of the fixture. The low frequency transducer 40 is supported 44 in the fixture and the position or depth of this transducer may be fixed or manually repositioned. All the transducers are typical construction for speakers including either a coil 42, piezo or similar mechanism to produce the sound. A ring 65 of lighting elements 60 is shown inside the fixture. This ring of lighting elements is replaceable to allow for upgrading or changing lighting elements in the future. The outside facing surface of the woofer and some or all of the tweeter is coated with a highly reflective surface to reflect light outside the fixture.

The LED's are powered by lower voltage, high voltage can be brought into the fixture and the voltage reduced with a power converter placed in a junction box 62 located within the fixture (shown) or external to the fixture. Power to the lighting elements 60 is brought through electrical conduit connection 80 to the electrical junction box 62 to the LED's.

Figure 4:
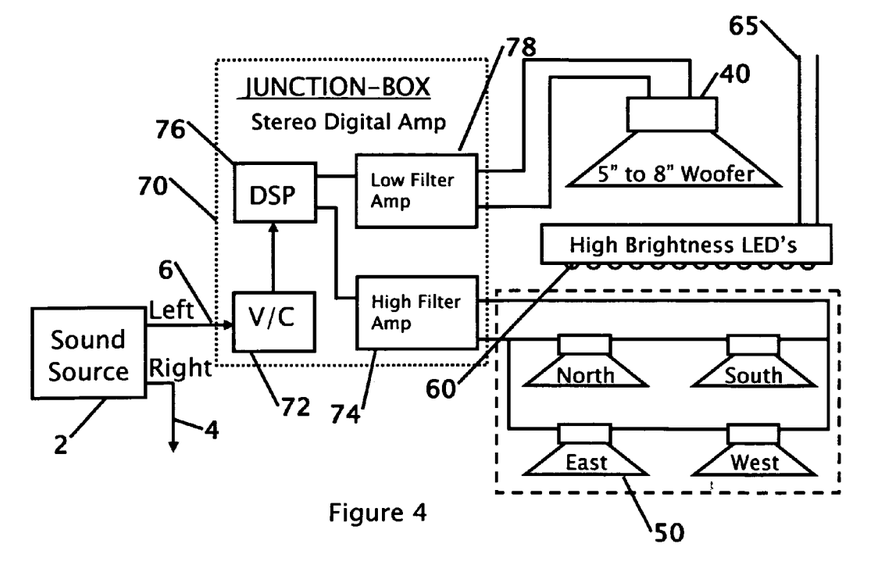
FIG. 4 shows a block diagram of the combination lighting and sound fixture.

The power converter reduces the incoming voltage (120 VAC) into a lower voltage of about 3.1 volts to operate the LED's. While the preferred embodiment utilizes 3.1 volts for the LED's it is contemplated that any voltage can be utilized and preferable where the lighting is powered by low voltage to minimize electrical requirement found in 120 VAC or high voltage products. The operating voltage can include the audio signal superimposed on the power lines, or can be brought into the fixture from a separate electrical connection and then into a separate, audio, junction box 70. The audio junction box can include a Digital Signal Processor (DSP) to adjust the sound from the speakers to produce anything from a flat sound to surround sound. The user can further use the DSP to switch between omni-directional usage to facilitate distributed audio and also THX type or similar home theater applications as well as tailoring to user preferred listening preferences. The DSP further can filter out 60 cycle noise to reduce or eliminate the 60 cycle noise from being transmitted out of the speakers. The junction box 70 may house a wireless receiver for the audio signal with an optional repeater that can extend the distance the wireless signal is transmitted FIG. 4 shows a block diagram of the combination lighting and sound fixture. The sound source 2 in this figure shows only a left and right signal output that might be found in a 2.1 channel audio system, but other systems with additional audio signal such as 4.1 channels or more system(s) will operate in a similar method. The two channels in this example are left 6 and right 4. Only the left channel is shown in this figure for simplicity. The channel is sent to a Junction Box 70 or if desired to an wall mounted junction box that includes several components including; a volume control 72 that sets the volume that will be emitted from the audio transducer; a digital signal processing module 76 (DSP) to adjust the sound from the speakers to produce anything from a flat frequency response to a fixed directional response that can include surround sound or can be tailored or adjustable to suit the user's preference. The user can further use the DSP to switch between omni-directional usage to facilitate distributed audio and also THX or THX type home theater applications or other sound dispersion patterns. The DSP further filters out 60 cycle noise to reduce or eliminate the 60 cycle noise from being transmitted out of the speakers; and a Low Filter Amplifier 78; and a High Filter Amplifier. The signal from the Low Filter Amplifier drives the low frequency transducer 40, while the High Filter Amplifier 74 drives one or more mid/high frequency transducers 50. The mid/high frequency transducers are shown labeled in this figure as North, South, East and West indicating one of many proposed orientation of the speakers.

Power connection 65 supplies power to the array of high brightness LED's 60. The LED's can be filtered with fixed or removable light filters to alter or tune the color of the illumination. It is also contemplated that the LED's can include multi-colored LED's and the color of the lighting can be changed or altered by adjusting the intensity of the different colored LED's. It is further contemplated that the lighting elements can vary intensity and color based upon the sound that is emitting from the speaker(s).

Figure 5:
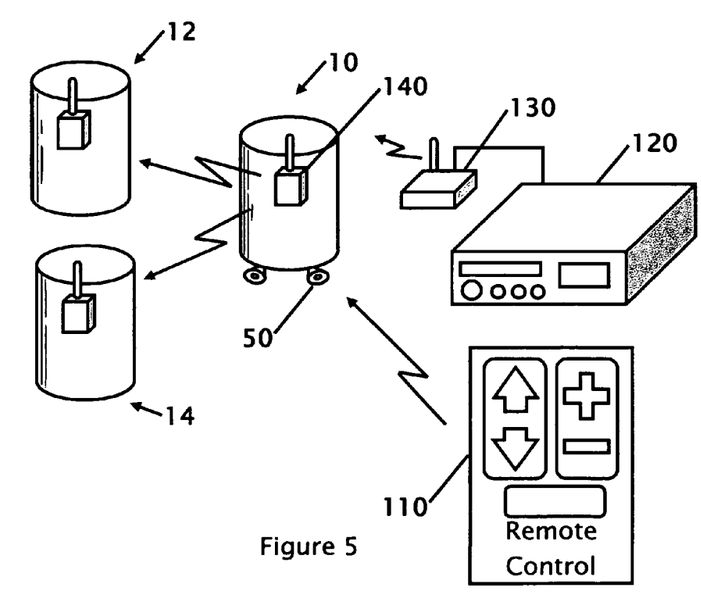
FIG. 5 shows a block diagram of the combination lighting and sound fixture with wireless controls for adjustment and signal repeating.

FIG. 5 shows a block diagram of the combination lighting and sound fixture with wireless controls for adjustment and signal repeating. The signal source 120 in this figure is a stereo connected to a wireless transmitter 130. The transmitter 130 sends a wireless signal to the receiver 140 placed on or within fixture 10. The fixture 10 utilizes the signal to emit sound. The receiver 140 may include a repeater that sends the signal to other fixtures 12 and 14 that emit the sound and may further also have repeaters that send the signal to additional fixtures. A handheld or wall mounted control unit 110 controls the volume and or tone from one or more fixtures. This unit can also adjust the intensity or color of the illumination and or extend/retract the sound emitters 50 from the fixture (s).

Figure 6:
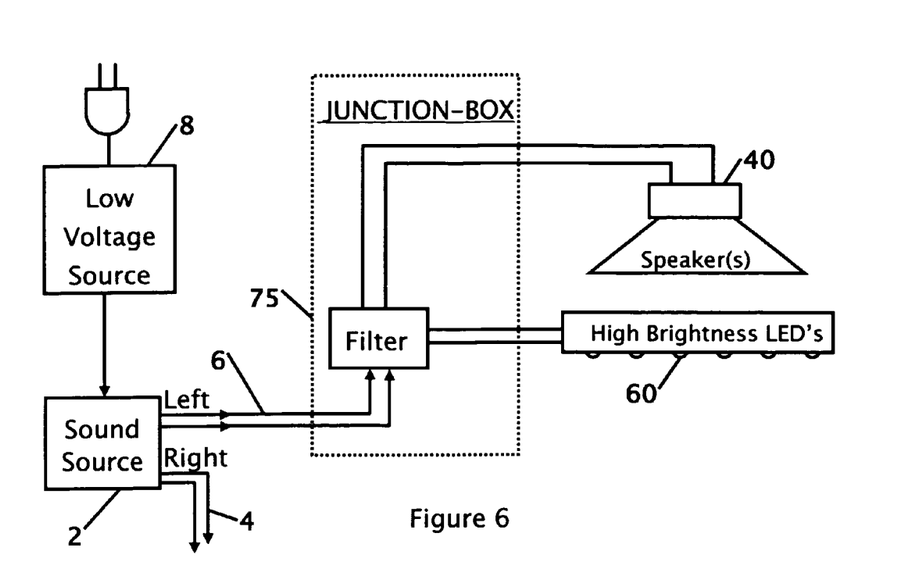
FIG. 6 shows a wired outdoor low voltage lighting and sound fixture showing the transmission of the lighting power, sound transmission, wiring, lighting element, and sound producing element.

FIG. 6 shows a wired outdoor low voltage lighting and sound fixture showing the transmission of the lighting power, sound transmission, wiring, lighting element, and sound producing element. A low voltage source 8 is powered from an external outlet or other similar source. While it is contemplated that the power source could be the amplifier that powers the speakers, working models utilize an external 12 volt step down transformer to provide the illumination power for the lights. The power source 8 is connected to a sound source 2 where the audio signal in embedded onto the power source for the lighting. The combined or muxed signal of the power and the audio signal is conducted to wiring 6. A left set or wiring 6 and a right set of wiring 4 conducts the power and audio signal to a left and right channel. While two channels are shown a single channel is contemplated as well as more than two channels are contemplated.

Figure 7:
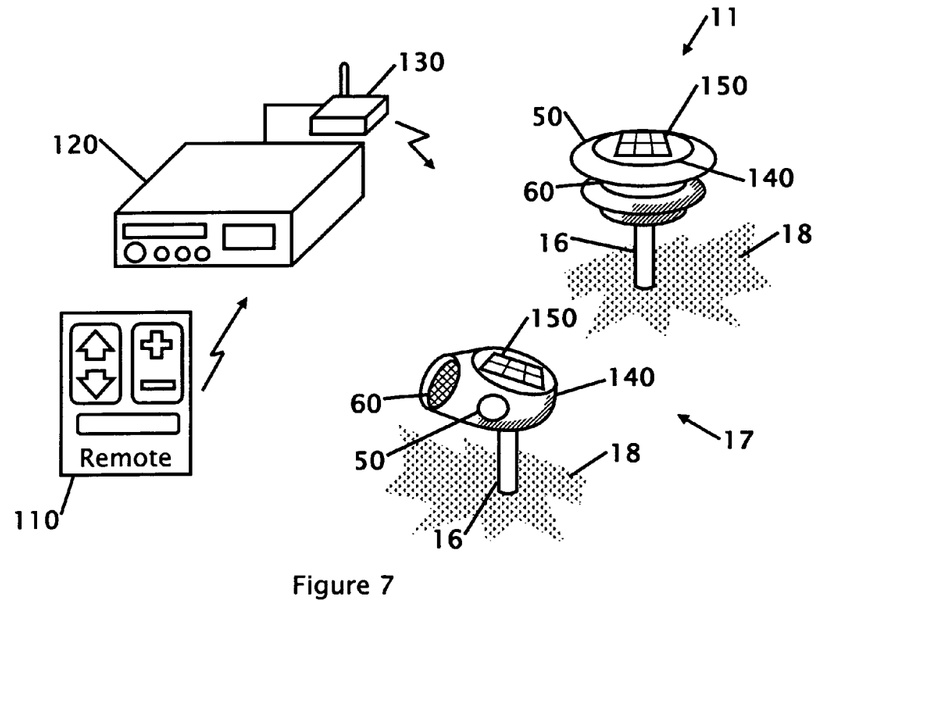
FIG. 7 shows a wireless transmitter and solar powered receiver circuit.

The combined signal is sent to a junction box 75 that is located near or within the light. FIG. 7 shows a ground light 11 and a spot light 17 that is often found in low voltage outdoor lighting. While these two types of lighting is shown other types and styles of outdoor lighting is possible and contemplated as alternative embodiments. Referring back to FIG. 6 where the lighting is wired to the signal, as opposed to FIG. 7 where the lighting is solar powered, the junction box 75 filters or demuxes the audio signal from the illumination voltage. The low voltage power for illumination is sent to the LED's 60 and the audio signal is sent to the speaker(s) 40. In another contemplated embodiment the audio signal includes control information to the lights where a plethora of light and speakers are connected and each light/speaker is controlled from the control information where the volume level and or light intensity is controlled.

FIG. 7 shows a wireless transmitter and solar powered receiver circuit. In this circuit a ground light 11 and a spot light 17 that is often found in low voltage outdoor lighting. While these two types of lighting is shown other types and styles of outdoor lighting is possible and contemplated as alternative embodiments. There lights with speakers are solar charged/powered with a solar cell 150 that converts energy from the sun into electricity that is stored in batteries 140 located within the fixture or located in close proximity to the fixture (11 and 17). Each fixture has one or more speakers 50 to provide sound and one or more lighting elements 60 to provide illumination. In solar powered outdoor lighting the illumination most often is provided with LED's. To provide the loudest sound level at the lowest power level Piezo electric speakers are utilized. The types of lighting and sound producing element are identified but other types are contemplated. The ground lighting fixture 11 provides a wide dispersion of illumination while the spit light 17 is directed to a particular location or feature for illumination. Both of these fixtures are provided with a ground spike 16 for installation of the fixture into the ground 18.

The signal source 120 in this figure is a stereo connected to a wireless transmitter 130. The transmitter 130 sends a wireless signal to the receiver 140 placed on or within the fixture (s). The receiver 140 may include a repeater that sends the signal to other fixtures 11 and 17 that emit the sound and may further also have repeaters that send the signal to additional fixtures. A handheld or wall mounted control unit 110 controls the volume and or tone from one or more fixtures. This unit can also adjust the intensity or color of the illumination and or extend/retract the sound emitters 50 from the fixture (s). The lighting and sound operate independently and during daylight the fixtures provide just sound, while at night they provide illumination and sound.

Thus, specific embodiments of a combination sound and light producing fixture have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A solar powered combination speaker lighting fixture comprising:
   a transmitter that transmits a wireless audio data signal;
   a plurality of wireless combination speaker lighting fixtures having;
   at least one solar collector;
   a power storage device;
   at least one sound producing element;
   at least one light producing element;
   a wireless receiver that receives said wireless audio data signal that controls the at least one light producing element and produces sound from the sound producing element, and
   whereby sound from each of said plurality of speaker light fixtures is adjustable.

2. A combination speaker lighting fixture according to claim 1 in which the at least one low voltage illumination element is an LED.

3. A combination speaker lighting fixture according to claim 1 in which the at least one low voltage illumination elements consist of an array of low voltage lighting element.

4. A combination speaker lighting fixture according to claim 1 in which the at least one low voltage illumination element and the at least one sound emitting element are independently replaced.

5. A combination speaker lighting fixture according to claim 1 in which the direction of illumination of the at least one low voltage illumination element is adjustable.

6. A combination speaker lighting fixture according to claim 1 in which the orientation of the at least one sound emitting is adjustable.

7. A combination speaker lighting fixture according to claim 1 in which the fixture further includes a digital signal processor to at least partially modulate a signal to the sound emitting element to at least partially compensate for placement or obstructions within or near the fixture.

8. An outdoor combination speaker lighting fixture comprising:
   a low voltage power source muxed with an audio signal that is wired to a plurality of separate low voltage outdoor illumination fixtures wherein each of the plurality of separate low voltage outdoor illumination fixtures has at least one demuxer that splits the low voltage power source to provide low voltage to an outdoor low voltage illumination fixture and splits the audio signal to at least one speaker located within the plurality of separate low voltage outdoor illumination fixtures.

9. A combination speaker lighting fixture according to claim 8 in which the at least one illumination element is a low voltage lighting element.

10. A combination speaker lighting fixture according to claim 8 that further includes a digital signal processor for filtering of 58 to 62 Hz noise and DC voltage noise.

11. A combination speaker lighting fixture according to claim 8 in which a plurality of sound emitting elements are utilized.

12. A combination speaker lighting fixture according to claim 11 in which at least one of the plurality of sound emitting elements are repositioned within the fixture.

13. A combination speaker lighting fixture according to claim 8 in which the at least one illumination element and the at least one sound emitting element are independently replaced.

* * * * *